358-69.  OR  3,198,879  SR

SEARCH ROOM

T 6532

COLOR TELEVISION INDEXING SYSTEM FOR REDUCING COLOR DISTORTION

Filed June 8, 1961  2 Sheets-Sheet 1

INVENTOR.
ROBERT E. FLORY
BY W. H. Sprague
Attorney

Aug. 3, 1965 R. E. FLORY 3,198,879
COLOR TELEVISION INDEXING SYSTEM FOR REDUCING COLOR DISTORTION
Filed June 8, 1961 2 Sheets-Sheet 2
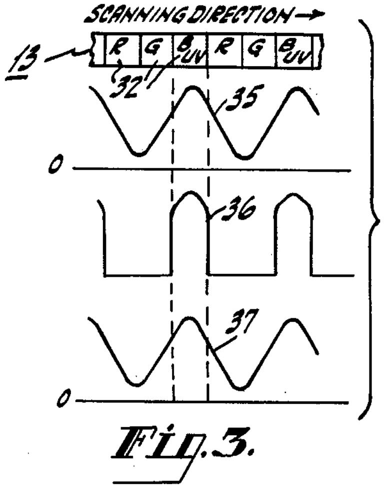
Fig. 3.
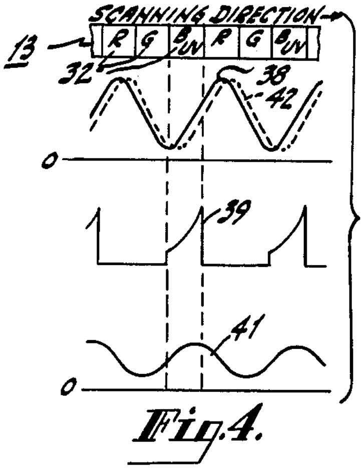
Fig. 4.
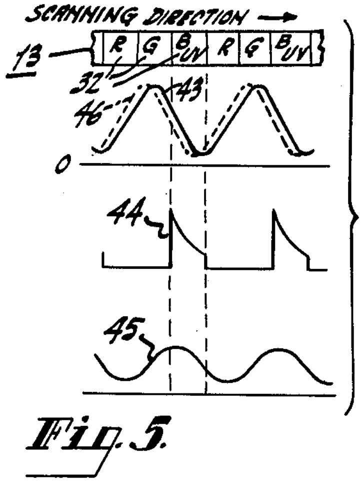
Fig. 5.
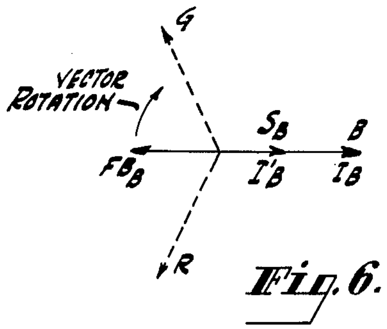
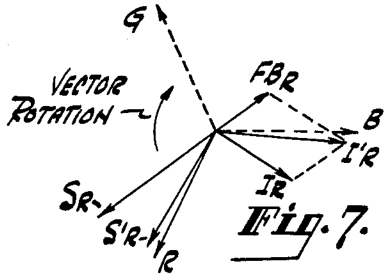
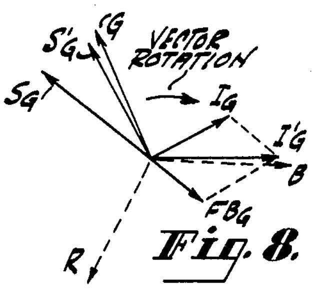
Fig. 6. Fig. 7. Fig. 8.
INVENTOR.
ROBERT E. FLORY
BY
W. H. Sprowagle
Attorney 3,198,879
Patented Aug. 3, 1965

3,198,879

COLOR TELEVISION INDEXING SYSTEM FOR REDUCING COLOR DISTORTION

Robert E. Flory, Princeton, N.J., assignor to Radio Corporation of America, a corporation of Delaware Filed June 8, 1961, Ser. No. 115,817
13 Claims. (Cl. 178—5.4)

This invention relates to color television image reproducing systems and particularly to those using cathode ray image reproducing tubes having luminescent screens in the form of different color-producing phosphor strips wherein the position of an electron beam relative to the strips is sensed and such information is used to control the modulation of the electron beam by color representative signals.

It has been proposed to effect color image reproduction by a cathode ray tube in which the color light-producing phosphors are arranged substantially vertically so that the strips may be exicted in rapid succession by an electron beam deflected transversely of the strips in a series of vertically spaced parallel lines. Such screens are additionally provided with indexing strips aligned with (i.e., parallel to) the color light-producing strips so that, when impinged by the electron beam, distinctive indexing signals are derived and are generally indicative of successive positions of the beam as it is deflected over the screen. Such indexing strips are arranged in predetermined relation to the color strips. One of the ways in which such indexing signals have been used is to control the modulation of the electron beam so that its intensity at any instant corresponds with the color which is desired to produce at the same time that the beam impinges upon a phosphor capable of making that color.

One of the advantages of controlling electron beam intensity modulation by such indexing signals is that particular compensation for any non-linearity of the horizontal beam deflection, non-uniformity in the spacing and/or width of the color phosphor strips and the like is unnecessary. It has been found that such a system works well when the indexing signals are derived from strips coinciding in position with the color strips capable of making the particular color corresponding to the signal by which the beam is modulated. Also, such a system works satisfactorily when reproducing desaturated or pastel shades of colors other than that produced by the color strips with which the indexing strips are registered.

Some color distortion is encountered, however, when it is attempted to make highly saturated colors other than that produced by the color strips with which the indexing strips are in register. In such cases the control wave derived from the indexing signals is shifted in phase so that, when it is used to control the electron beam modulation, a shift in the hue of the color produced by the cathode ray tube is effected thereby causing a color distortion.

It is an object of the present invention to at least substantially reduce color distortion in a system such as that described.

In accordance with this invention beam position indexing signals derived from a cathode ray color image-reproducing tube having vertically oriented color phosphor light-producing strips are employed to produce a sampling wave which is modulated in phase and in amplitude by color representative signals for use in controlling the intensity modulation of an electron beam which is deflected transversely of the color strips. The modulator for effecting such modulation has one input terminal for the indexing signal information, another input terminal for the color representative signals and an output terminal. A feedback circuit is provided from the output terminal of the modulator to the indexing signal input terminal. The feedback circuit includes a phase shifter so that a sample of the modulated sampling wave may be combined suitably with the indexing signal to compensate for any undesired phase shift produced in the indexing signal.

The invention may be more fully understood from the following description of an illustrative embodiment shown in the accompanying drawings of which:

FIGURE 3 is a series of waveforms, shown in relation to the color phosphor strips of the cathode ray tube screen, such as would exist when the system is operated to produce a highly saturated color by color phosphor strips in registry with the indexing signal-producing strips;

FIGURE 4 is a similar set of typical waveforms such as would be developed when the electron beam is modulated to produce a highly saturated color by color phosphor strips which appear in the screen on one side of the indexing signal-producing strips;

Figures 1, 2:
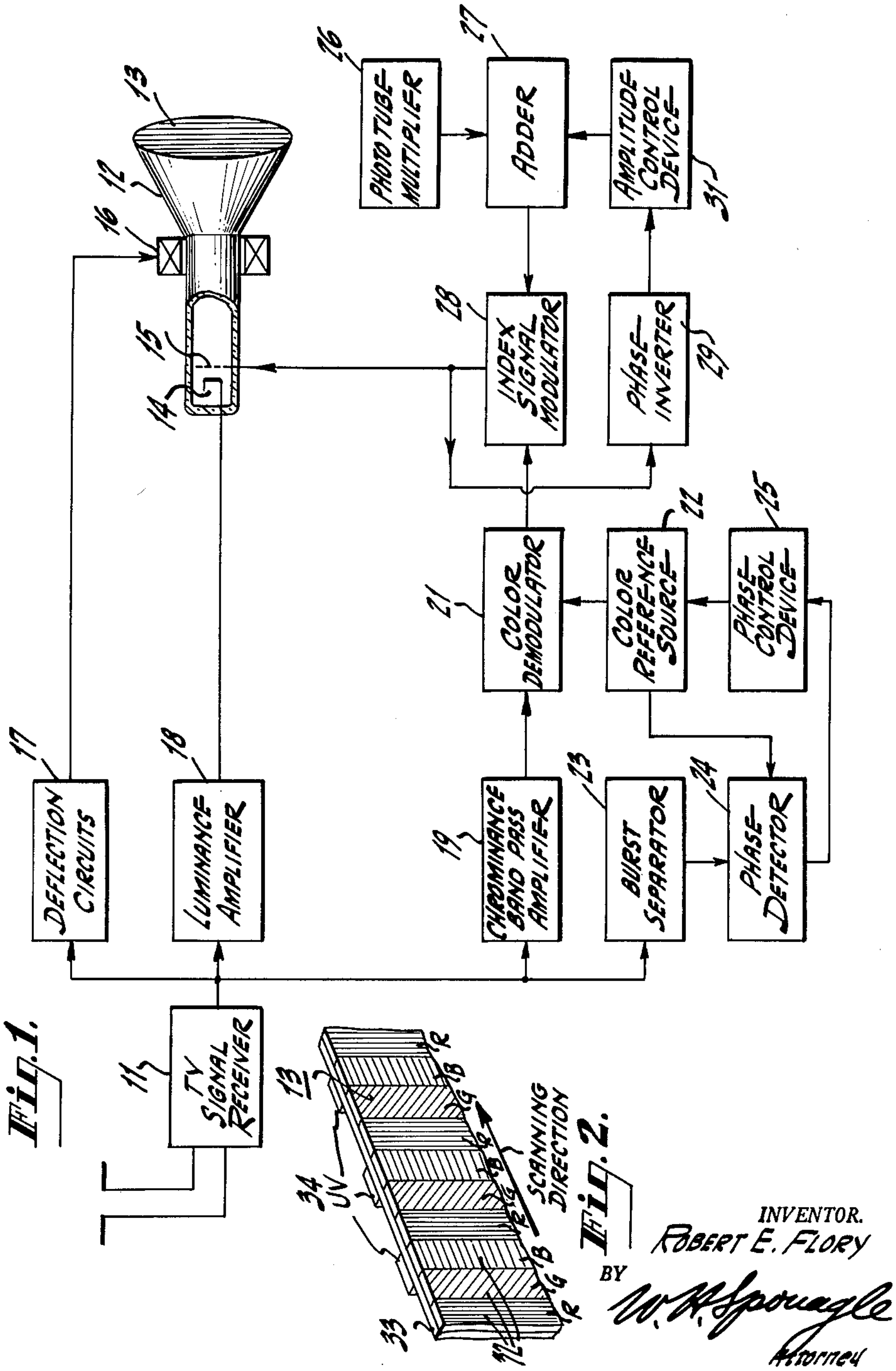
FIGURE 1 is a block diagram of a television receiver embodying the invention.
FIGURE 2 is a fragmentary illustration to an enlarged scale of a portion of the luminescent screen of a color image-reproducing cathode ray tube used in a system embodying the invention.

FIGURE 5 is a similar set of typical waveforms such as would be developed when the electron beam is modulated to produce a highly saturated color by color phosphor strips which appear in the luminescent screen of the other side of the indexing signal-producing strips; and FIGURES 6, 7 and 8 are vector diagrams showing the manner in which the present invention compensates for the kind of color distortion illustrated in FIGURES 4 and 5.

A color television receiver embodying the invention is generally illustrated in FIGURE 1. The radiated carrier wave which is modulated by a composite color television signal including a luminance signal component and a chrominance signal component is received and processed by any well known television receiver 11. Such a composite television signal derived from the receiver 11 is separated by any known means into its various components for operation of a color image-reproducing device such as a cathode ray tube or kinescope 12. This tube is provided with a luminescent screen 13 composed of a multiplicity of groups of vertically oriented phosphor strips, the respective strips of each group being capable of emitting light of different colors when excited by an electron beam. Illustrative details of such a screen will be described subsequently in connection with FIGURE 2. The kinescope is also provided with an electron gun including a cathode electrode 14 and an intensity-controlling grid electrode 15.

The electron beam is deflected both horizontally and vertically to scan the usual rectangular raster of vertically spaced substantially parallel lines transverse to the phosphor strips by means of a deflection yoke 16. The composite color television signal derived from the receiver 11 includes deflection synchronizing pulses which are applied to deflection circuits 17 for energization of the deflection yoke 16 in the usual manner.

The luminance signal component of the composite signal derived from the receiver 11 is applied to and processed in a luminance signal channel including a luminance signal amplifier 18. As shown in this particular receiver for illustration of the present invention, the luminance signal is applied to the cathode 14 of the color kinescope 12. The chrominance signal component of the composite signal derived from the receiver 11 is applied to a chrominance signal channel which includes conventional apparatus for deriving color representative signals from the chrominance component. In the present U.S. standard color television signal, the chrominance signal component is a phase and amplitude modulated subcarrier wave having a nominal frequency corresponding to one of the higher video signal frequencies. In the present case, this frequency is approximately 3.58 mc. per second.

As is typical in known receivers for such a composite color television signal, the chrominance component is separated from the rest of the signal by means such as a chrominance signal bandpass amplifier 19. This amplifier, for example, passes signals in the range of 2 to 4 mc. Thus, the phase and amplitude modulated color subcarrier wave is impressed upon one input circuit of a color signal demodulator 21. This demodulator is of the synchronous variety and is supplied with selected phases of a reference signal wave from a reference signal source 22. This reference signal wave has the nominal frequency of the color subcarrier wave and the phases of this wave which are supplied to the color demodulator 21 will depend upon the particular phase angles at which it is desired to demodulate the color subcarrier wave. As is known in the art such demodulating phases are, to a considerable degree, matters of choice and depend upon such considerations as maximum bandwidth of the signals to be produced, the possible use of matrixing circuits and, if such are used, the character and relative complexity of such circuits, and the like. Accordingly, it will be understood that, for the purpose of describing the present invention, there may be derived from the color demodulator 21 red and blue representative signals. Particularly, such signals usually are termed "color difference signals" or "color minus luminosity signals."

The received composite color television signal also includes periodic bursts of several cycles of the color subcarrier nominal frequency for use in controlling the phase of the reference signal wave produced by the source 22. Accordingly, the composite color television signal also is impressed upon a burst separator 23 which operates to produce in its output circuit only the periodic bursts of the color synchronizing signal. Such bursts are impressed upon one of two input circuits of a phase detector 24, the other input circuit having impressed thereon the reference signal wave derived from the source 22. Any phase deviation between these signals is detected and produces in the output circuit of the phase detector a signal indicative of such phase deviation which is applied to a control device 25 and, as indicated, the output of this device is connected to the reference signal source 22. In a typical instance where the source 22 is an oscillator, the control device 25 may be a reactance tube forming one of the frequency determining elements of the oscillator. Such arrangements are known and frequently used in systems of this character and hence no further description thereof is deemed necessary.

All of the apparatus of FIGURE 1 described up to this point may be of the type disclosed in "Color Television Service Data—1960, No. T5—" by RCA Service Company, Camden, N.J., printed May 10, 1960.

The indexing signals, which in the illustrative embodiment of the invention are in the form of invisible (e.g. ultra violet) radiation from the luminescent screen, are sensed by a phototube multiplier 26 which may be provided, for example, with an ultra violet passing filter for response only to this type of radiation. An illustrative phototube multiplier is an RCA type 931–A. These indexing signals are impressed upon a first input circuit of an adder 27 for combination with an electron beam intensity modulating wave to be compensated in a manner subsequently to be described. The combined signal output from the adder is impressed upon one input of an index signal modulator 28. There also are impressed upon this modulator the color representative signals derived from the color demodulator 21. The index signal modulator 28 may be any known device (such as that used in the TX–1B Colorplexer manufactured by Radio Corporation of America) by which to produce a sampling wave which is phase and amplitude modulated by color representative signals. The output of the index signal modulator 28 is coupled to the intensity control grid 15 of the color kinescope 12 for control of the intensity of the electron beam in combination with that effected by the cathode 14 under the control of the luminance signal component of the composite color television signal.

The output of the index signal modulator 28 also is connected through a feedback signal circuit including a phase inverter 29 and an adjustable amplitude controlling device 31. The other end of this feedback circuit is connected to a second input circuit of the adder 27. It is by means of this feedback circuit, when the phase inverter 29 and the amplitude controlling device 31 are properly adjusted, that the desired compensation of any unwanted phase deviation of the indexing signal wave is effected.

Before describing the manner in which an unwanted phase deviation of the indexing signal wave is caused and the compensation of it provided by the instant invention, reference next will be made to FIGURE 2 for a more detailed description of the luminescent screen 13 of FIGURE 1. As previously indicated, the screen is composed of a multiplicity of groups of three different color light-producing phosphor strips such as the strips 32. In the present example it is seen that the order of the strips in the indicated direction in which the beam scans over them is red, green, blue as indicated by the letters R, G, B, R, G, B, etc. These strips may be covered on the side toward the electron gun by a backing 33 such as a layer of aluminum which is sufficiently thin to be pervious to the electron beam. On the back side of this film there are provided ultra violet (UV) radiation-producing indexing strips 34 which as indicated are aligned with (i.e., parallel to) all of the phosphor strips and are in registry with the blue light-producing phosphor strips B. It is to be understood that the indexing strips 34 may be registered with any other color light-producing phosphor strips or any combination thereof. Also, as is known in the art, the UV phosphor material may be mixed with any of the color light-producing phosphor material so that separate indexing strips are not necessary. In any case, wherever the electron beam is directed to a color strip with which an indexing strip is registered, not only is the appropriate color light produced, but also a pulse of ultra violet radiation is produced. The magnitude, or energy content, of the ultra violet pulse depends upon the intensity of the electron beam and the length of time it impinges upon the indexing strip.

For an explanation of the manner in which the indexing signal wave derived from the UV indexing pulses is undesirably shifted in phase when making highly saturated colors other than that produced by the color phosphor strips with which the indexing strips are registered will now be given with reference to the waveforms of FIGURES 3, 4 and 5. In order not to unduly complicate this explanation, it will be assumed that the color strips of the color kinescope are of equal widths and are uniformly spaced relative to one another. In such a case, the electron beam will be modulated in intensity symmetrically as the beam traverses the strips. In other words, assuming that the blue phosphor strips are excited at the zero degree phase angle of the color cycle, the red phosphor strips will be excited at a 120° phase angle and the green phosphor strips at a 240° phase angle. Also, it will be assumed that the sampling wave by which the beam intensity is modulated is of a substantially sinusoidal character at the frequency of the color cycle. It will be understood by those skilled in the art, however, that other color phosphor strip arrangements may be employed, other phase angles of the sampling wave may be utilized, and sampling waveforms other than a sinusoidal one may be utilized. It will be assumed further that the color representative signals derived from the color demodulator 21 of FIGURE 1 and impressed upon the index signal modulator 28 are red and blue color difference signals $R-Y$ and $B-Y$ respectively, where Y represents the luminance signal component of the received composite television signal. Again, it will be understood by those skilled in the art that other color difference signals may be employed in practicing this invention. All such alternatives are known in the art and form no part of the instant invention which is capable of operation in systems using any of these known techniques.

Reference first will be made to FIGURE 3. With the UV indexing strips 34 registered with every blue (B) one of the color phosphor strips 32 as indicated in FIGURE 2, the sampling wave 35 indicates the intensity modulation of the electron beam with reference to the color and indexing strips of the screen 13 as the beam scans the screen from left to right as indicated in FIGURE 3. The waveforms are representative of the results obtained when it is desired to make a highly saturated blue portion of the image on the screen 13. It is seen that the sampling wave 35 has maximum intensity when it is centered over the blue and indexing strips of the screen. As a consequence, the indexing signals developed while the beam impinges upon the blue and indexing strips are represented by the symmetrically shaped pulses 36. These pulses are converted in a known manner by means such as a low pass filter having an upper cutoff frequency of less than the second harmonic of the nominal repetition rate of the pulses 36 into a substantially sinusoidal index signal wave 37. The conversion of the pulses 36 to an indexing signal wave 37 may be effected either in the indexing signal modulator 28 of FIGURE 1 or in suitable apparatus feeding the indexing signal input to the modulator. It is seen that the indexing signal wave 37 is in substantially exact phase with the sampling wave 35 representing the beam intensity modulation. The index signal modulator 28 modulates the index signal wave 37 with the color representative signals derived from the color demodulator 21 and thus converts it into the sampling wave 35 by which to modulate the electron beam intensity suitably to make the desired saturated blue portion of the reproduced image.

When it is attempted to make a highly saturated red portion of the reproduced image without benefit of the instant invention, the manner in which the undesired color distortion occurs is illustrated by the waveforms of FIGURE 4. The curve 38 represents the desired sampling wave for producing saturated red. This curve also indicates the intensity modulation of the electron beam with reference to the color and indexing strips of the screen 13 as the beam scans it from left to right as indicated in this figure. It is seen that the sampling wave 38 representing the electron beam intensity has substantially its minimum amplitude as the beam impinges the left hand portions of the blue and indexing strips of the screen. This beam intensity increases somewhat as the beam traverses the blue and indexing strips causing the generation of indexing pulses 39 shaped somewhat as illustrated with appreciably more of the energy content of the pulses occurring to the right of center of each of the indexing strips.

When such pulses are converted into the substantially sinusoidal index signal wave 41 it is seen that this wave is shifted in phase in the direction in which the screen is scanned by the electron beam. Also, by virtue of the fact that the indexing pulses 39 have approximately only one-half of the energy of the pulses 36 of FIGURE 3, the amplitude of the index signal wave 41 is less than that of the indexing signal wave 37 of FIGURE 3. The amplitude difference of the indexing signal waves is of substantially no significance so far as the problem of color distortion in such a system is concerned. The real problem arises from the phase shift of the index signal waveform 41 relative to the color and indexing strips of the kinescope screen. Were the indexing signal wave 41 to be applied to the index signal modulator 28 of FIGURE 1 for modulation by the color representative signals, a sampling wave 42 would be produced. In conformance with the assumed symmetrical beam intensity modulation, the indexing signal wave 41 would be shifted in phase by 120° by the modulator 28 to form the sampling wave 42. It is seen that such a sampling wave has its maximum amplitude, not as desired at the time that the electron beam is centered over the red phosphor strips of the screen, but instead when the electron beam is impinging on both the red and green phosphor strips. In such a case, instead of producing a saturated red portion of the color image a somewhat orange-red hue would be produced. This, of course, is an undesired color distortion.

FIGURE 5 illustrates the kind of unwanted color distortion which is experienced when an attempt is made to reproduce a highly saturated green portion of the color image without some compensation such as that provided by the present invention. The curve 43 represents the desired sampling wave for producing saturated green. As in the case of the blue and red examples previously described, this curve also indicates the beam intensity modulation with reference to the color and indexing strips of the screen 13 as the beam traverses the screen from left to right as indicated. In this case, the sampling wave 43 has its maximum amplitude and, hence the beam has its maximum intensity, substantially at the centers of the green strips. As the sampling wave 43 indicates, the beam intensity is considerably less than maximum as the beam impinges upon the left hand portions of the blue and indexing strips and this intensity decreases still further to substantially a minimum while the beam is traversing the remaining portions of the indexing strips. As a consequence of such beam excitation of the indexing strips, indexing pulses 44 are generated and have approximately the shapes indicated in this figure.

The conversion of these pulses into the substantially sinusoidal index signal wave 45 results in this wave having its phase shifted oppositely to the direction in which the screen is scanned by the electron beam. Again as in the saturated red example illustrated in FIGURE 4, the wave 45 has a somewhat reduced amplitude by virtue of the reduced energy content of the indexing pulses 44. If such a wave were applied to the index signal modulator 28 of FIGURE 1 for modulation by green representative signals it would, in accordance with the assumed conditions, be shifted in phase by 240° so as to produce a sampling wave 46. It is seen that the electron beam intensity as represented by this wave is not at its maximum as the beam impinges the centers of the green strips. Instead, the maximum beam intensity occurs while the electron beam is impinging on both the red and green phosphor strips. In such a case, the reproduced color would be yellow-green instead of a pure saturated green as desired.

The vector diagrams of FIGURES 6, 7 and 8 indicate vectorially the undesired phase shifts produced in the absence of this invention and in addition illustrate the manner in which the present invention operates to materially compensate for these phase shifts and therefore reduce the color distortion which would result from such phase shifts. In the vector diagrams of FIGURES 6, 7 and 8, the vectors B, R and G represent the symmetrical or 120° phase angles at which it is desired to modulate an indexing signal wave for proper excitation of the color phosphor strips.

FIGURE 6 represents the conditions which exist when it is desired to reproduce a saturated blue portion of the image. This is the situation illustrated by the waveforms of FIGURE 3. The vector $I_B$ represents the indexing wave produced by the indexing pulses derived from the kinescope screen. Since as assumed the indexing strips are in register with the blue phosphor strips, the indexing signal wave has the blue sampling phase angle B. The impression of such a wave upon the index signal modulator 28 of FIGURE 1, therefore, will produce in the output of this modulator a blue sampling wave represented by the vector $S_B$ which is in phase with the B vector.

In accordance with the present invention a portion of the output derived from the index signal modulator 28 of FIGURE 1 is fed back through the phase inverter 29, the adjustable amplitude control device 31 and the adder 27 to the indexing wave input of the modulator 28. The feedback factor may be adjusted by the amplitude control device 31 to give optimum performance of the apparatus. For the purpose of the present description, it will be assumed that the feedback factor is 0.5 meaning that the feedback signal has approximately ½ the amplitude of the indexing signal wave applied to the modulator. This condition is represented in FIGURE 6 wherein the feedback wave is represented by the vector $FB_B$. When the original indexing signal wave $I_B$ is combined with the feedback wave $FB_B$ in the adder 27 of FIGURE 1, the resultant wave is represented by the vector $I'_B$. It is seen that, under the assumed conditions, this resultant indexing wave $I'_B$ is in phase with the blue sampling wave B produced by the modulator 28 and has one-half the amplitude of the original indexing signal wave $I_B$.

The modulator 28 of FIGURE 1 then produces the blue sampling wave $S_B$ in phase with the blue vector B. This, of course, is the case where no phase shift of the indexing signal wave would be encountered and hence no compensation is necessary to avoid color distortion. As indicated, however, the present invention including the described feedback circuit for the modulator 28 does function to reduce color distortion when it is desired to make highly saturated colors other than those produced by strips in register with the indexing strips which in the present case are the blue strips. Because this feedback circuit is in operation at all times and, therefore, functions when it is desired to reproduce a highly saturated blue portion of the image, the foregoing explanation with reference to FIGURE 6 serves to point up the fact that no deterioration of blue image reproduction is experienced when the present invention is employed.

FIGURE 7 represents vectorially the significant phase relationships of the various waves appearing in different parts of the disclosed circuit when a highly saturated red portion of the image is to be reproduced. As in the previous example given with reference to FIGURE 6 the 120° phase angle functioning of modulator 28 of FIGURE 1 is represented by the B, R and G vectors. The vector $I_R$ represents the phase-shifted (somewhat exaggerated for clarity) indexing signal wave as derived from the screen of the color kinescope. This vector is seen to lead the blue vector B (the phase of a true indexing signal wave) and therefore corresponds to the phase relationship indicated by the waveforms of FIGURE 4. This figure also indicates that, if a wave having the phase represented by the vector $I_R$ were to be used as input to the modulator 28 from the adder 27 without compensation by the modulator 28 of FIGURE 1, there would result a red sampling wave indicated by the vector $S_R$. This vector would lead the red vector R in phase by the same angle that the original indexing wave vector $I_R$ leads the blue vector B. Also the vector $S_R$ would represent an uncompensated sampling wave momentarily derived from the output of modulator 28 of FIGURE 1.

When the uncompensated sampling wave $S_R$ is inverted in phase by the phase inverter 29 of FIGURE 1 and is adjusted in amplitude by the amplitude control device 31, there is produced for impression upon the adder 27 a feedback wave represented by the vector $FB_R$. The combination of this vector $FB_R$ with the original indexing wave vector $I_R$ produces a compensated indexing signal wave represented by the vector $I'_R$. This vector has approximately the same phase as the blue vector B. When this compensated indexing signal wave represented by the vector $I'_R$ is impressed upon the modulator 28 there is produced in the output of the modulator a compensated sampling signal wave represented by the vector $S'_R$ which leads in phase the compensated indexing signal vector $I'_R$ by 120° as determined by the modulator according to the assumed conditions. The vector $S'_R$ has approximately the same phase as the red vector R. Hence, when the electron beam impinges upon the red phosphor strips of the kinescope screen it will have its maximum intensity approximately as it impinges upon the centers of the red phosphor strips. In this way, substantial compensation is made for the phase shifts inherently produced in the indexing signal wave as derived from the screen and the unwanted color distortions are materially reduced.

FIGURE 8 is similar to that of FIGURE 7 except that it represents the conditions prevailing when it is desired to reproduce highly saturated green portions of the color image. In this case, the indexing signal wave vector $I_G$ lags the vector B and is converted by the modulator into a 240° phase-removed and uncompensated green samplling wave $S_G$. The feedback wave $FB_G$, when combined with the original green indexing signal wave $I_G$, produces a compensated green indexing signal wave $I'_G$ which again is seen to have approximately the same phase as the blue vector B. When the compensated green indexing signal wave $I'_G$ is impressed upon the modulator 28 of FIGURE 1, a compensated green sampling wave $S'_G$ removed therefrom by 240° is produced. This compensated sampling wave has approximately the same phase as the green vector G. Hence, the electron beam intensity is approximately at its maximum as the beam impinges upon the centers of the green phosphor strips, thereby producing substantially pure saturated green light with a minimum of color distortion.

The usefulness of the present invention is not necessarily limited to the operation of a color television image reproducing system of the type described in making highly saturated colors. To the extent that a tendency toward color distortion is present in such a system when making desaturated or pastel shades of color, the present invention also functions to reduce such color distortion. It will be evident to those skilled in the art from a consideration of the described manner in which such a system operates and particularly with reference to FIGURES 4 and 5 that the beam intensity does not vary appreciably as successive color strips of the luminescent screen are scanned to make pastel colors as it does when highly saturated colors are being made. Hence, the indexing pulses have much the same symmetrical shape as the indexing pulses 36 of FIGURE 3. As previously described, substantially no color distortion is produced when such indexing signals are developed.

It will be understood that the system described herein as illustrative of the principals embodied in the present invention is susceptible of modification and the use of known alternatives without departing from the scope of the invention. For example, it will be appreciated that the index signal-producing elements of the screen may be in register or mixed with the color light-producing phosphor strips of any color or any combination of such strips. Furthermore, the present invention is not limited to the use of any particular materials for the production of any particular kind of indexing signals. For example, the indexing strips may be made of such material as to have a detectably different secondary electron emission ratio from that of the remainder of the luminescent screen. In such a case, the indexing signals will be in the form of secondary electron emission current instead of the ultra violet radiation as illustratively disclosed herein.

Also, the indexing signal-sensing means such as the photo-tube multiplier 26 of FIGURE 1 may be incorporated therein as an electron multiplier and/or may be followed by any other conventional type of signal amplifier in order to provide an indexing wave of suitable amplitude for use in the system. Other conventional signal amplifiers and/or signal limiters, also may be used in the system in a conventional manner where required. For example, as indicated in the vector diagrams of FIG- URES 6, 7 and 8, the compensated indexing wave applied to the index signal modulator 28 of FIGURE 1 has an amplitude which may vary depending upon the color being produced. The amplitude of the compensated indexing wave $I'_B$ for a saturated blue portion of the reproduced image has a smaller amplitude than the compensated indexing wave $I'_R$ developed when a saturated red portion of the image is being reproduced. Such amplitude differences may be eliminated or reduced by the provision of a suitable limiter or automatic gain-controlled amplifier connected in the system between the adder 27 and the index signal modulator 28.

What is claimed is:

1. In a color television image-reproducing system including a cathode ray tube having a luminescent screen comprising a plurality of vertically oriented phosphor strips capable of emitting light of different colors when impinged by an electron beam, and a plurality of index strips aligned with said phosphor strips and capable of producing indexing signals when impinged by an electron beam, and in which an electron beam is deflected in a series of vertically spaced parallel lines transverse to said phosphor and index strips, a system for phase-modulating an indexing wave derived from said indexing signals by color representative signals to produce a sampling wave for controlling the intensity of said electron beam, said system comprising: a phase and amplitude modulator having first and second input terminals and an output terminal, means for impressing an indexing wave and color representative signals respectively on said first and second input terminals; and a feedback circuit coupling said output terminal to said first input terminal for compensating for any undesired phase shift of said indexing wave so as to produce at said output terminal a sampling wave having a phase determined substantially entirely by said color representative signals for control of the intensity of said electron beam.

2. In a color television image-reproducing system including a cathode ray tube having a luminescent screen comprising a plurality of vertically oriented phosphor strips capable of emitting light of different colors when impinged by an electron beam, and a plurality of index strips aligned with said phosphor strips and capable of producing indexing signals when impinged by an electron beam, and in which an electron beam is deflected in a series of vertically spaced parallel lines transverse to said phosphor and said index strips, a system for phase modulating an indexing wave derived from said indexing signals by color representative signals to produce a sampling wave for controlling the intensity of said electron beam, said system comprising: a phase and amplitude modulator having first and second input terminals and an output terminal, means for impressing an indexing wave and color representative signals respectively on said first and second input terminals; and means for feeding back from said output terminal to said first input terminal a wave of suitable phase and amplitude to compensate for any undesired phase shift of said indexing wave so as to produce at said output terminal a sampling wave having a phase determined substantially entirely by said color representative signals for control of the intensity of said electron beam.

3. In a color television image-reproducing system; a cathode ray tube having a luminescent screen comprising a multiplicity of groups of vertically oriented phosphor strips, the respective strips of each group being capable of emitting light of different colors when impinged by an electron beam, and a plurality of index strips aligned with said phosphor strips and capable of producing indexing signals when impinged by an electron beam, the number of said index strips bearing a predetermined relationship to the number of said multiplicity of groups of phosphor strips; means for deflecting an electron beam in a series of vertically spaced parallel lines transverse to said phosphor and index strips; means energizable to modulate the intensity of said beam in accordance with color-representative signals; means for deriving indexing signals from said cathode ray tube and for converting said indexing signals into an unmodulated indexing wave having a phase relative to phosphor strips of a particular color which varies in sense and magnitude, at least in part, in accordance with the color signal modulation of said beam; a source of color representative signals; means for phase-modulating said indexing wave by said color representative signals to produce a sampling wave; means responsive to said phase-modulated sampling wave for modifying said indexing wave so as to produce for ultimate modulation by said color representative signals a compensated indexing wave having a substantially constant phase relative to the phosphor strips of said particular color; and means utilizing the resultant compensated phase-modulated sampling wave derived from said phase-modulated means to energize said beam intensity modulating means.

4. In a color television image-reproducing system; a cathode ray tube having a luminescent screen comprising a multiplicity of groups of vertically oriented phosphor strips, the respective strips of each group being capable of emitting light of different colors when impinged by an electron beam, and a plurality of index strips aligned with said phosphor strips and capable of producing indexing signals when impinged by an electron beam, the number of said index strips bearing a predetermined relationship to the number of said multiplicity of groups of phosphor strips; means for deflecting an electron beam in a series of vertically spaced parallel lines transverse to said phosphor and index strips; means for deflecting an electron beam in a series of vertically spaced parallel lines transverse to said phosphor and index strips; means energizable to modulate the intensity of said beam in accordance with color-representative signals; means for deriving indexing signals from said cathode ray tube and for converting said indexing signals into an unmodulated wave having a phase relative to phosphor strips of a particular color which varies undesirably in sense and magnitude, at least in part, in accordance with the color signal modulation of said beam; a source of color representative signals; means for phase-modulating said unmodulated wave by said color representative signals; means responsive to said phase-modulated wave for modifying said unmodulated wave oppositely to said undesired phase variation to substantially eliminate said phase variation from said unmodulated wave; and means utilizing the resultant phase-modulated wave derived from said phase-modulating means to energize said beam intensity modulating means.

5. In a color television image-reproducing system; a cathode ray tube having a luminescent screen comprising a multiplicity of groups of vertically oriented phosphor strips, the respective strips of each group being capable of emitting light of different colors when impinged by an electron beam, and a plurality of index strips aligned with said phosphor strips and capable of producing indexing signals when impinged by an electron beam, the number of said index strips bearing a predetermined relationship to the number of said multiplicity of groups of phosphor strips; means for deflecting an electron beam in a series of vertically spaced parallel lines transverse to said phosphor and index strips; means for deriving indexing signals from said cathode ray tube and for converting said indexing signals into a substantially unmodulated indexing wave; a source of color representative signals; means for phase modulating said indexing wave by said color representative signals; means for deriving from said modulating means a sample of said phase-modulated wave; means for substantially inverting the phase of said derived sample and adding said phase-inverted sample to said unmodulated indexing wave; and means utilizing the resultant phase-modulated wave derived from said modulating means to modulate the intensity of said electron beam.

6. In a receiver of a composite color television signal including a luminance signal component and a chrominance signal component: a cathode ray color image-reproducing tube having a luminescent screen comprising a multiplicity of groups of vertically oriented phosphor strips, the respective strips of each group being capable of emitting light of different colors when impinged by an electron beam, and a plurality of index strips aligned with said phosphor strips and capable of producing indexing signals when impinged by an electron beam, the number of said index strips bearing a predetermined relationship to the number of said multiplicity of groups of phosphor strips; means for deflecting an electron beam in a series of vertically spaced parallel lines transverse to said phosphor and index strips; means for deriving indexing signals from said cathode ray tube and for converting said indexing signals into a substantially unmodulated continuous wave; means for phase-modulating said continuous wave by color representative signals derived from said chrominance signal component; means for deriving from said modulating means a sample of said phase-modulated wave; means for substantially inverting the phase of said derived sample and adding said phase-inverted sample to said unmodulated continuous wave; and means utilizing the resultant phase-modulated wave derived from said modulating means together with said luminance signal component to modulate the intensity of said electron beam.

7. In a receiver of a composite color television signal including a luminance signal component and a chrominance signal component: a cathode ray color image-reproducing tube having a luminescent screen comprising a multiplicity of groups of vertically oriented phosphor strips, the respective strips of each group being capable of emitting light of different colors when impinged by an electron beam, and a plurality of index strips aligned with said phosphor strips and capable of producing indexing signals when impinged by an electron beam, the number of said index strips bearing a predetermined relationship to the number of said multiplicity of groups of phosphor strips; means for deflecting an electron beam in a series of spaced parallel lines transverse to said phosphor and index strips; means operative in response to said chrominance signal component to produce individual color representative signals; means responsive to indexing signals derived from said cathode ray tube for producing and indexing wave; modulating means having first and second input terminals and an output terminal; means impressing said indexing wave and said color representative signals respectively on said first and second input terminals to produce at said output terminal a sampling wave modulated in phase and amplitude by said color representative signals; a feedback circuit coupling said output terminal to said first input terminal for producing a suitably phase-shifted version of said sampling wave for combination with said indexing wave to develop a compensated indexing wave at said first input terminal; and means utilizing the resultant sampling wave derived from the output terminal of said modulating means together with said luminance signal component to modulate the intensity of said electron beam.

8. In a receiver of a composite color television signal including a luminance signal component and a chrominance signal component: a cathode ray color image-reproducing tube having a luminescent screen comprising a multiplicity of groups of vertically oriented phosphor strips, the respective strips of each group being capable of emitting light of different colors when impinged by an electron beam, and a plurality of index strips aligned with said phosphor strips and capable of producing indexing signals when impinged by an electron beam, the number of said index strips bearing a predetermined relationship to the number of said multiplicity of groups of phosphor strips; means for deflecting an electron beam in a series of vertically spaced parallel lines transverse to said phosphor and index strips; a color demodulator operative in response to said chrominance signal component to produce individual color representative signals; means responsive to indexing signals derived from said cathode ray tube for producing an indexing wave; modulating means having first and second input terminals and an output terminal; means impressing said indexing wave and said color representative signals respectively on said first and second input terminals to produce at said output terminal a sampling wave modulated in phase and amplitude by said color representative signals; a phase-shifting feedback circuit coupling said output terminal to said first input terminal for producing a suitably phase-shifted version of said sampling wave for combination with said indexing wave to develop a compensated indexing wave at said first input terminal; and means utilizing the resultant sampling wave derived from the output terminal of said modulating means together with said luminance signal component to modulate the intensity of said electron beam.

9. In a receiver of a composite color television signal including a luminance signal component and a chrominance signal component: a cathode ray color image-reproducing tube having a luminescent screen comprising a multiplicity of groups of vertically oriented phosphor strips, the respective strips of each group being capable of emitting light of different colors when impinged by an electron beam, and a plurality of index strips aligned with said phosphor strips and capable of producting indexing signals when impinged by an electron beam, the number of said index strips bearing a predetermined relationship to the number of said multiplicity of groups of phosphor strips; means for deflecting an electron beam in a series of vertically spaced parallel lines transverse to said phosphor and index strips; a color demodulator operative in response to said chrominance signal component to produce individual color representative signals; means for deriving indexing signals from said cathode ray tube; modulating means having first and second input terminals and an output terminal; means impressing said index signals and said color representative signals respectively on said first and second input terminals to produce at said output terminal a wave modulated in phase and amplitude by said color representative signals; a feedback circuit coupling said output terminal to said first input terminal, said feedback circuit including a phase inverter of said modulated wave; an adder coupled to receive and combine said phase-inverted modulated wave and said index signals and to impress them upon said first input terminal; and means utilizing the resultant phase-modulated wave derived from the output terminal of said modulating means together with said luminance signal component to modulate the intensity of said electron beam.

10. In a receiver of a composite color television signal including a luminance signal component and a chrominance signal component: a cathode ray color image-reproducing tube having a luminescent screen comprising a multiplicity of groups of vertically oriented phosphor strips, the respective strips of each group being capable of emitting light of different colors when impinged by an electron beam, and a plurality of index strips aligned with said phosphor strips and capable of producing indexing signals when impinged by an electron beam, the number of said index strips bearing a predetermined relationship to the number of said multiplicity of groups of phosphor strips; means for deflecting an electron beam in a series of spaced parallel lines transverse to said phosphor and index strips; a color demodulator operative in response to said chrominance signal component to produce individual color representative signals; means for deriving indexing signals from said cathode ray tube; modulating means having first and second input terminals and an output terminal; means impressing said index signals and said color representative signals respectively on said first and second input terminals to produce at said output terminal a wave modulated in phase and amplitude by said color representative signals; a feedback circuit coupling said output terminal to said first input terminal, said feedback circuit including a phase inverter of said modulated wave and a device for controlling the ampliture of said modulated wave; an adder coupled to receive and combine said phase-inverted and amplitude-controlled modulated wave and said index signals and to impress them upon said first input terminal; and means utilizing the resultant phase-modulated wave derived from the output terminal of said modulating means together with said luminance signal component to modulate the intensity of said electron beam.

11. In a color television system, wave modulating apparatus comprising: a modulator operative to modulate a plurality of signals respectively on predetermined phases of a wave supplied thereto; a source of a wave to be modulated, said wave having a phase which may vary relative to a reference; a source of a plurality of color representative signals to be modulated on a wave, said signal source being coupled to said modulator; means for supplying to said modulator a wave to be modulated, said wave being derived from said wave source and said modulator operating to produce a modulated wave having color representative signal phases which vary respectively from said predetermined phases in correspondence with any phase variation of said wave to be modulated relative to said reference; and means for combining said modulated wave with said wave to be modulated in such phase and amplitude as to substantially eliminate from the wave supplied to said modulator any phase variation relative to said reference.

12. In a color television system, wave modulating apparatus comprising: a modulator operative to modulate a plurality of signals respectively on predetermined phases of a wave supplied thereto; a source of a wave to be modulated, said wave having a phase which may vary relative to a reference; a source of a plurality of color representative signals to be modulated on a wave, said signal source being coupled to said modulator; means for supplying to said modulator a wave to be modulated, said wave being derived from said wave source and said modulator operating to produce a modulated wave having color representative signal phases which vary respectively from said predetermined phases in correspondence with any phase variation of said wave to be modulated; means for inverting the phase of said modulated wave; and means for combining said phase-inverted modulated wave with said wave to be modulated in such amplitude as to substantially eliminate from the wave supplied to said modulator any phase variation relative to said reference.

13. In a color television system, wave modulating apparatus comprising: a modulator operative to modulate a plurality of signals respectively on predetermined phases of a wave supplied thereto; a source of a wave to be modulated, said wave having a phase which may vary relative to a reference; a source of a plurality of color representative signals to be modulated on a wave, said signal source being coupled to said modulator; means for supplying to said modulator a wave to be modulated, said wave being derived from said wave source and said modulator operating to produce a modulated wave having color representative signal phases which vary respectively from said predetermined phases in correspondence with any phase variation of said wave to be modulated; means for inverting the phase of said modulated wave; means for decreasing the amplitude of said modulated wave; and means for combining said phase-inverted and decreased-amplitude modulated wave with said wave to be modulated so as to substantially eliminate from the wave supplied to said modulator any phase variation relative to said reference.

No references cited.

DAVID G. REDINBAUGH, *Primary Examiner.*

ROBERT SEGAL, *Examiner.*